United States Patent [19]
Reid et al.

[11] Patent Number: 6,115,776
[45] Date of Patent: *Sep. 5, 2000

[54] NETWORK AND ADAPTOR WITH TIME-BASED AND PACKET NUMBER BASED INTERRUPT COMBINATIONS

[75] Inventors: Richard Reid, Mountain View; William Paul Sherer; Glenn Connery, both of Sunnyvale, all of Calif.

[73] Assignee: 3COM Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,538

[22] Filed: May 2, 1997

Related U.S. Application Data

[60] Provisional application No. 60/032,124, Dec. 5, 1996.

[51] Int. Cl.$^7$ .................................................. G06F 13/24
[52] U.S. Cl. .................... 710/260; 710/261; 710/262; 710/263; 710/264; 710/265; 710/266; 709/230; 709/234; 709/235; 709/250
[58] Field of Search .................... 395/733, 200.6, 395/200.8, 200.64, 200.65; 364/239, 466; 710/260, 261, 262, 263, 264, 265, 266; 709/230, 250, 234, 235

[56] References Cited

U.S. PATENT DOCUMENTS

| | | | |
|---|---|---|---|
| 4,223,307 | 9/1980 | Albritton | 340/656 |
| 5,363,506 | 11/1994 | Fukuoka | 710/260 |
| 5,440,690 | 8/1995 | Rege et al. | 395/200.02 |
| 5,530,874 | 6/1996 | Emery et al. | 710/262 |
| 5,583,997 | 12/1996 | Hart | 395/200.15 |
| 5,652,749 | 7/1997 | Davenport et al. | 370/466 |
| 5,708,817 | 1/1998 | Ng et al. | 710/266 |
| 5,717,932 | 2/1998 | Szczepanek et al. | 710/260 |
| 5,761,431 | 6/1998 | Gross et al. | 709/225 |
| 5,822,553 | 10/1998 | Gifford et al. | 710/129 |
| 5,887,175 | 3/1999 | Col et al. | 710/260 |

*Primary Examiner*—Ayaz R. Sheikh
*Assistant Examiner*—Frantz Blanchard Jean
*Attorney, Agent, or Firm*—Wagner, Murabito & Hao LLP

[57] ABSTRACT

A network adaptor that generates interrupts to a host system when data is received from the network or downloaded from system memory for transmittal over the network. The adaptor generates interrupts after a delay determined by an interrupt deferral mechanism, which includes one or more timers and/or one or more counters. Interrupts are generated, for example, after a predetermined time has elapsed after a DMA completion or after a certain number of packets are counted.

43 Claims, 3 Drawing Sheets

NETWORK AND ADAPTOR WITH TIME-BASED AND PACKET NUMBER BASED INTERRUPT COMBINATIONS

BACKGROUND OF THE INVENTION

This application claims priority from provisional patent application Ser. No. 60/032,124, filed Dec. 5, 1996, which discussed a number of background concepts related to the invention.

The current invention relates to the field of electronic circuits. More particularly, the current invention relates most directly to improvements in networked computer environments and has particular applications to the transmission of information between digital devices over a communications medium. The invention also is concerned with the interface between a network adaptor and its host operating system in order to improve network performance and reduce network operation burden on a host processor. The invention concerns in some details a network adaptor driver, which generally consists of program code running on a host's CPU which controls or interfaces with aspects of adaptor operation.

A very wide variety of types of computer systems and networks exist, each having variations in particular implementations. The present invention will be described with reference to particular types of systems for clarity but this should not be taken to limit the invention, and it will be apparent to those of skill in the art that the invention has applications in many different types of computer systems. The invention therefore should not be seen as limited except as provided in the attached claims.

A number of different aspects of computer networks are discussed in co-assigned pending U.S. applications Ser. Nos. 08/313,674; 08/542,157; 08/506,533; and 08/329,714 each of which are incorporated herein by reference to the extent necessary to understand the invention.

Networking Devices Standards

This specification presumes familiarity with the general concepts, protocols, and devices currently used in LAN networking and WAN internetworking applications such as, for example, the IEEE 802 and ISO 8802 protocol suites and other series of documents released by the Internet Engineering Task Force that are publicly available and discussed in more detail in the above-referenced patent applications and will not be fully discussed here.

FIG. 1

FIG. 1 illustrates a local area network (LAN) 40 of a type that might be used today in a moderate-sized office or academic environment and as an example for discussion purposes of one type of network in which the present invention may be effectively employed. LANs are arrangements of various hardware and software elements that operate together to allow a number of digital devices to exchange data within the LAN and also may include internet connections to external wide area networks (WANs) such as WANs 82 and 84. Typical modern LANs such as 40 are comprised of one to many LAN intermediate systems (ISs) such as ISs 60–62 and 67 that are responsible for data transmission throughout the LAN and a number of end systems (ESs) such as ESs 50*a–d,* 51*a–c,* and 52*a–g,* that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 64 and 66 are referred to as routers, and IS 67 is referred to as a repeater, however many different LAN configurations are possible, and the invention is not limited in application to the network shown in FIG. 1.

The LAN shown in FIG. 1 has segments 70*a–e,* 71*a–e,* and 72*a–e,* and 73*a.* A segment is generally a single interconnected medium, such as a length of contiguous wire, optical fiber, or coaxial cable or a particular frequency band. A segment may connect just two devices, such as segment 70*a,* or a segment such as 72*d* may connect a number of devices using a carrier sense multiple access/collision detect (CSMA/CD) protocol or other multiple access protocol such as a token bus or token ring. A signal transmitted on a single segment, such as 72*d,* is simultaneously heard by all of the ESs and ISs connected to that segment.

Drivers and Adaptors

Each of the ISs and ESs in FIG. 1 includes one or more adaptors and a set of drivers. An adaptor generally includes circuitry and connectors for communication over a segment and translates data from the digital form used by the computer circuitry in the IS or ES into a form that may be transmitted over the segment, e.g., electrical signals, optical signals, radio waves, etc. An ES such as 50*b* will generally have one adaptor for connecting to its single segment. A LAN IS such as 61 will have five adaptors, one for each segment to which it is connected. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

Packets

In a LAN such as 40, data is generally transmitted between ESs as independent packets, with each packet containing a header having at least a destination address specifying an ultimate destination and generally also having a source address and other transmission information such as transmission priority.

FIG. 2 depicts an example of a particular type of packet as it may be transmitted to or from router 64 on LAN segment 73*a.* The packet is essentially an Ethernet packet, having an Ethernet header 202 and a 48-bit Ethernet address (such as 00:85:8C:13:AA) 204, and an Ethernet trailer 230. Within the Ethernet packet 200 is contained, or encapsulated, an IP packet, represented by IP header 212, containing a 32 bit IP address 214 (such as 199.22.120.33). Packet 200 contains a data payload 220 which holds the data the user is interested in receiving or holds a control message used for configuring the network. Other known packet formats are contemplated by the invention, including, but not limited to, ATM, token bus, FDDI, etc.

Layers

An additional background concept of network communications is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices handle the data traffic.

Adaptor to Host Interface

Another aspect of networks is the interface between the network and the host operating system or processors that transmit data via the network. Some types of network protocols may require a large amount of attention from a host processor. This can be undesirable where a host's activity on the network impinges on the host processor's ability to perform other host functions such as running user applications. Adaptors may also differ in their ability to buffer network traffic. Some adaptors rely on the host to buffer most network traffic and do not include a large amount of buffer memory on the adaptor itself.

Increasing Traffic Capacity of Some Network Devices Create a Need For New Solutions To Improve Network Performance In recent years, the amount of data users wish to transmit over a network has increased dramatically. This increase has placed an increasingly heavy burden on all parts of the network including on the host system's resources to service the various networking functions performed by the adaptor and to send and receive data to and from the adaptor, and on the capacity of various ISs in the network and various network connections. A number of existing networks include a mixture of components or segments, some capable of operating at a maximal speed of the network and others operating at slower speeds.

What is needed is an improved network allowing a computer system such as an ES to incorporate a high performance and high speed adaptor without unduly slowing down other data handling by a host's processor.

SUMMARY OF THE INVENTION

The current invention relates to a computer operating system in which interrupts are generated to a processor by events which then require processor time to service. The present invention includes improvements to a device driver or to an adaptor, that schedules interrupts to a processor. The invention is thereby able to reduce the number of interrupts generated by the network to the processor and to thereby reduce the processing burden to the operating system of servicing those interrupts. This aspect of the present invention may be embodied in an adaptor driver for use with a network adaptor card and/or in software or hardware running on the adaptor card.

This aspect of the invention takes advantage of the fact that traffic on LANs tends to be self-similar, i.e., if a particular ES has very recently received a packet, it is likely that it will receive another packet very quickly. This holds true for transmissions from an ES as well.

According to this aspect of the invention, an adaptor defers generating an interrupt when a packet is received at an ES. In one embodiment, an adaptor driver causes the adaptor to defer generating interrupts for a period of time after an exit from the interrupt handler and after the host system hardware would be capable of detecting another interrupt, for example, after a packet has been received by the ES from the network or after a particular packet has been downloaded to the adaptor for transmission over the network. In this aspect, a timer may be associated with a particular interrupt reason, with any adaptor interrupt reason, or the timer can occur at a specific time. In different embodiments, the threshold can be adjustable or it may be fixed in hardware.

One reason for an adaptor interrupt would be the completion of DMA (Direct Memory Access) transfer of data from the host to the adaptor. A technique used in some prior adaptors is to include control information in a descriptor attached to a data packet that causes an interrupt to be generated at the time that the last packet queued has been downloaded. The assumption of these adaptors is that the queue within the host system memory grows to contain many packets as the host gets ahead of the network.

However, this assumption will no longer be true as the transmission speed of networks increases, with the result that servicing the network may put an undesirable burden on the host processor. For example, assume a gigabit Ethernet adaptor. In this gigabit case, it would be common for the network transfer to occur at rate faster than the maximum sustained transfer capability of the host's memory subsystem. This means it will be difficult for the host end-system to get ahead of the network. Rather than having the host respond to a DMA completion transfer interrupt from the adaptor with each completion, the invention may program a delay for the DMA completion interrupt that often allows more packets to be queued by the host for transmission without causing additional interrupts to the host.

A different embodiment of the invention uses a counter to indicate that once an adaptor completes (either transmits or receives) a certain number of packets it then generates an interrupt to the host. A further embodiment combines timer and counter interrupts so that an interrupt is generated after a certain number of packets are processed or after a certain time elapses.

DESCRIPTION OF THE PREFERRED EMBODIMENT

Figure 1:
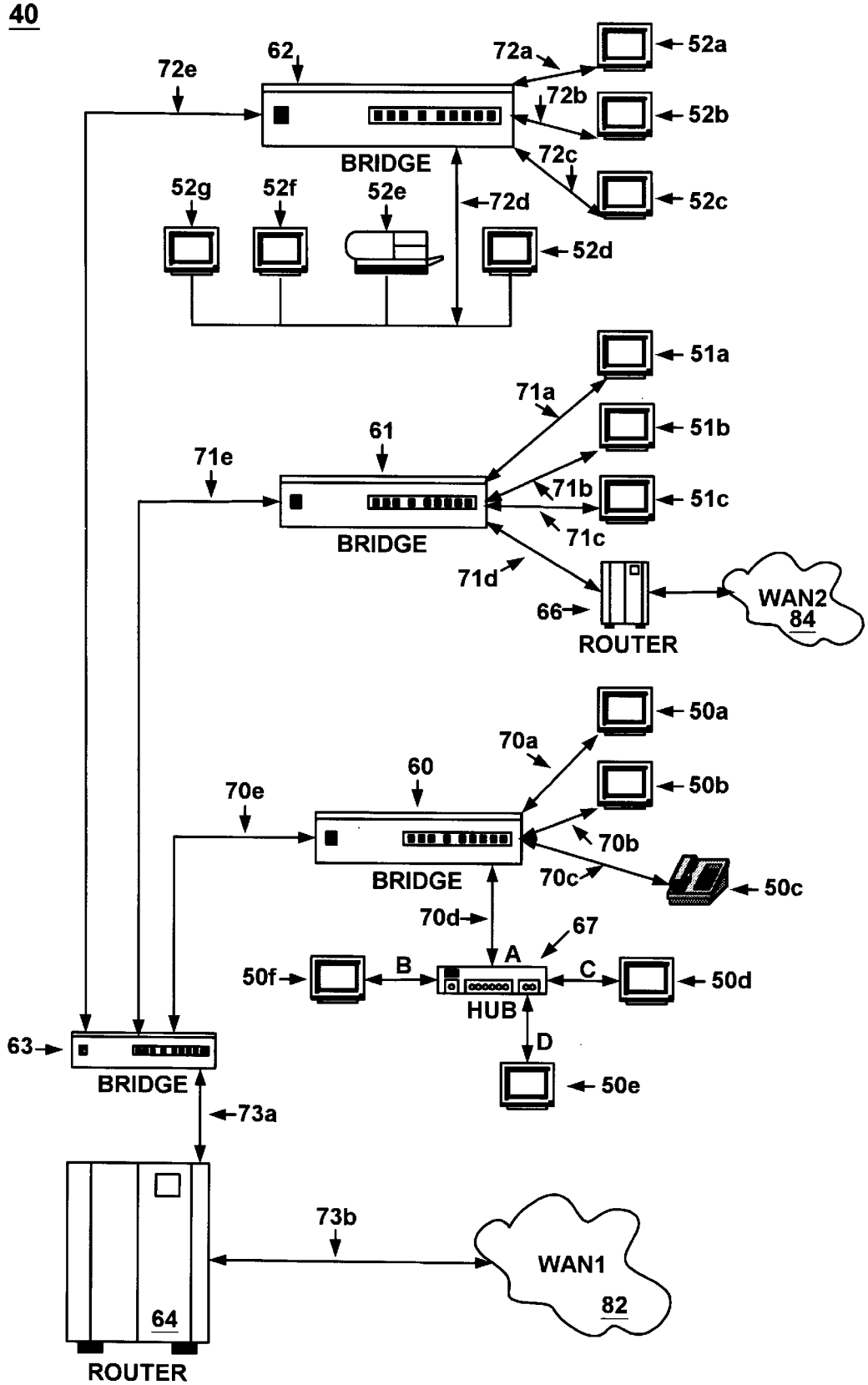
FIG. 1 is a diagram of one type of local area network in which the invention may be effectively employed.
Figure 2:
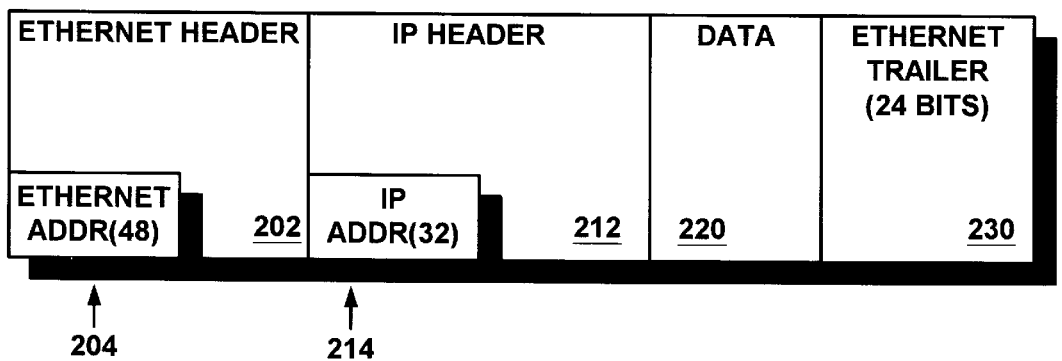
FIG. 2 is a diagram of an IP packet encapsulated in an Ethernet packet.
Figure 3:
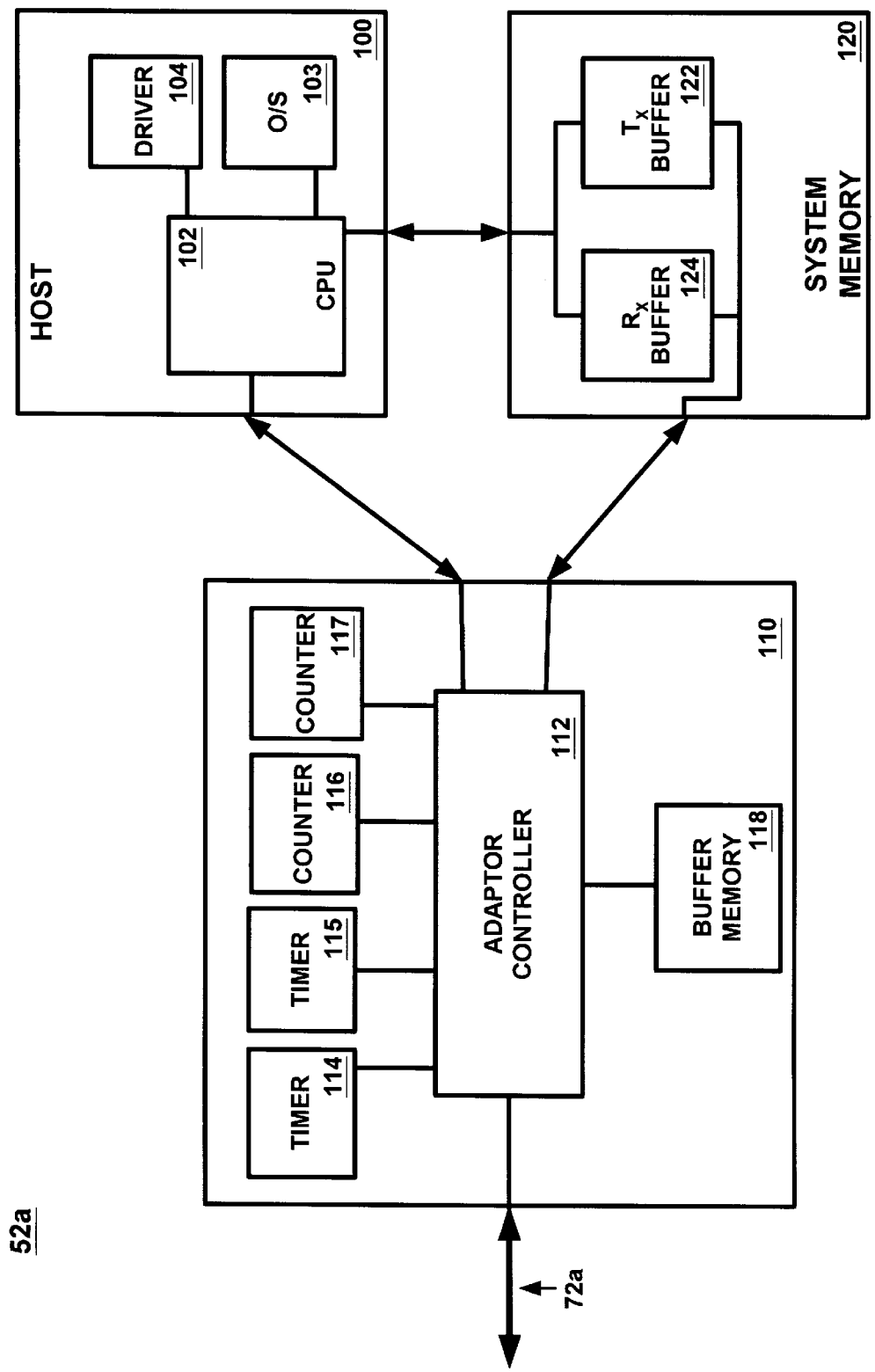
FIG. 3 shows a simplified block diagram of an end system (ES) including an adaptor according to one embodiment of the present invention.

FIG. 3 shows a simplified block diagram of an end system (ES) 52a including an adaptor 110 according to one embodiment of the present invention. In various embodiments, ES 52a could be a personal computer, a LAN server, or any familiar data processing equipment such as workstations, laptops, and printers, and may additionally be digital devices such as digital telephones or real-time video displays. Host computer 100 is connected to adaptor 110 and includes system memory 120. Host 100 is also connected to other components (not shown) as necessary, such as a monitor, sound card, keyboard or any other user input device, etc. Adaptor 110 provides a connection to a local area network (LAN) over communication segment 72a. Segment 72a in one embodiment is a length of contiguous wire, but may be any other communication medium such as an optical fiber, a coaxial cable or a particular frequency band.

Host 100 includes processor 102. Host operating system (OS) 103 and adaptor driver 104 are resident as hardware and/or software on host 100. Processor 102 runs host operating system (OS) 103 and provides overall control of the system operations, data handling and user applications. Adaptor driver 104 generally consists of program code running on host CPU 102 which controls or interfaces with aspects of adaptor operation by providing instructions to, and receiving requests and information from, adaptor controller 112. In one embodiment, adaptor controller 112 is connected to first timer 114, second timer 115, first counter 116, second counter 117 and buffer memory 118. Additionally, adaptor controller 112 provides connectivity to segment 72a, for transmitting and receiving data over LAN 40.

System memory 120 includes transmit buffer 122 and receive buffer 124. Receive buffer 124 and transmit buffer 122 are logical spaces in system memory 120. Transmit buffer 122 provides a temporary store for data packets which are to be transmitted to LAN 40 via adaptor 110. Similarly, receive buffer 124 provides a temporary store for data packets received from LAN 40 until processor 102 is free to process the data.

In operation, when data is desired to be transmitted over LAN 40, host 100 transfers blocks, or packets, of data to system memory 120 to be stored in transmit buffer 122. The data to be transferred is processed by processor 102 and can originate from, for example, an external memory drive or any other memory device including system memory 120, or a keyboard, digital image scanner, or any other user input device. Transmit buffer 122 queues the data for downloading to adaptor 110. In one embodiment, each packet received from host 100 includes a descriptor attached to it which provides control information for the associated packet. Adaptor controller 112 receives instructions from driver 104 indicating that network data transfer is to be effected. The instructions also include information identifying the data to be transferred in transmit buffer 122. Adaptor controller accesses system memory 120 in accordance with the instructions received from driver 104, and downloads the identified packets in transmit buffer 122. Adaptor controller translates the data packets from the original digital form into the appropriate form for transmission over segment 72a, for example, electrical signals, optical signals, radio waves, etc. In an alternate embodiment, buffer memory 118 provides a temporary store for downloaded packets.

In order for the operating system to know that the data has been downloaded from the host memory 120 to the adaptor and to know, therefore, that more data may be placed in transmit buffer 122, adaptor controller 112 generates and sends an interrupt to the host operating system. Typically, when an interrupt request is received by the host, the host responds by requesting status information, such as whether the DMA transfer of data from host to adaptor was successful, for example. Processing interrupt requests can be very burdensome to a host operating system, especially where the host is attempting multiple network transfers and/or where the network transfer rate exceeds the maximum sustained transfer capability of the host's memory subsystem.

A technique to reduce the processing burden to the operating system servicing DMA complete interrupts is to control adaptor controller 112 to generate an interrupt when the last packet of a series of packets queued in transmit buffer 122 has been downloaded. An interrupt control bit is included in each packet descriptor attached to the packets queued in transmit buffer 122 indicating whether or not an interrupt is to be generated. Adaptor controller 112 is programmed to generate an interrupt if it reads the appropriate interrupt control bit attached to a downloaded packet. In this way, by attaching a control bit to only the last packet queued indicating that an interrupt should be generated, an interrupt is only generated after the last packet has been downloaded from system memory 120 to the adaptor.

A similar technique to reduce the processing burden to the host operating system is to control adaptor controller 112 to generate an interrupt when there are no longer any packets queued in transmit buffer 122 after a packet has been downloaded. Adaptor controller 112 is programmed to access transmit buffer 122, to download packets stored therein, and to generate an interrupt when it no longer detects any packets queued for downloading in transmit buffer 122. In this way, an interrupt is only generated when there are no longer any packets queued for downloading. This allows the host operating system the ability to queue packets to system memory 120 while adaptor controller is accessing and downloading presently queued packets, for example.

The above techniques provides the host with processing time without receiving interrupts from the adaptor for each packet downloaded. This allows the host operating system to process additional data for transmission, for example, and get ahead of the network. However, as the transmission speed of networks increases, the host may no longer be able to stay ahead of the network. For example, with a newer gigabit Ethernet adaptor, it could be common for the network transfer to occur at a faster rate than the maximum sustained transfer capability of the host's memory subsystem. Rather than requiring the host to respond to a DMA completion interrupt with each completion, programming a delay for sending the DMA completion interrupt would allow more packets to be queued for transmission before the host is required to respond to an interrupt.

Adaptor 110, in one embodiment, includes first timer 114. First timer 114 is programmed with a time value and provides a delay time for generating an interrupt associated with an interrupt reason. After an interrupt reason triggers, or sets, first timer 114, an interrupt is not generated until after the timer delay. For example, when adaptor controller 112 downloads a packet from transmit buffer 122 containing a control bit in the attached descriptor indicating that an interrupt be generated, an interrupt is not generated until after the appropriate time delay indicated by first timer 114. Similarly, for example, when adaptor controller 112 detects that there are no more packets queued in transmit buffer 122, an interrupt is not generated until after the time delay indicated by first timer 114. In one embodiment, the time delay value is a preset value according to general system parameters, such as network transfer speed, host memory transfer speed, segment medium length and characteristics, etc. The delay may be user-programmable, or it may be system-programmable based on varying system parameters. For instance, the delay time may vary based on the size of data packets being transmitted or on the length of segment transmission medium connecting adaptor 110 and system memory 120. The timer delay can be associated with a particular interrupt reason or with any adaptor interrupt reason, and the delay can be set for a specific time irrespective of system parameters. The threshold value can be adjustable or it may be fixed in hardware. Further, because different interrupt reasons can have different criticalities (i.e., some interrupts may be more important), first timer 114 can be programmed with different time values for different interrupt reasons. For example, some interrupt reasons may necessitate a quick delay time while for others, such as a memory transfer in memory 120, a long delay time will suffice.

In one embodiment, first timer 114 can be reset after it has been triggered. For example, first timer 114 can be programmed to be reset during "countdown" of the delay time if adaptor controller 112 downloads another packet from transmit buffer 122 containing a control bit in the attached descriptor indicating that an interrupt be generated. Similarly, for example, first timer 114 can be reset if adaptor controller 112 detects that more packets have been queued in transmit buffer 122. First timer 114 can be programmed with a maximum cumulative deferral time, such that no matter haw many times first timer 114 is reset, adaptor controller 112 generates an interrupt when the maximum deferral time is reached.

In another embodiment, adaptor 110 includes first timer 114 and second timer 115. First timer 114 is programmed with a first time value and provides a delay time for generating an interrupt associated with a first interrupt reason. Similarly, second timer 115 is programmed with a second time value and provides a delay time for generating an interrupt associated with a second interrupt reason. For example, first timer 114 may be associated with, and triggered by, a DMA complete interrupt reason, and second timer 115 may be associated with, and triggered by, a packet being received from network 40. The first and second time values can be programmed to be the same or different depending on the criticality or importance of the associated interrupt reasons. Adaptor controller 112 can be programmed to generate an interrupt after only one, or after both, of the first and second delays have elapsed. Additional timers can be included in adaptor 110 for additional interrupt reasons.

In another embodiment, adaptor 110 includes first counter 116 connected to adaptor controller 112. In this embodiment, first counter 116 counts the number of packets as they are downloaded from transmit buffer 122 to adaptor controller 112. Alternatively, first counter 116 counts the number of packets transmitted over the network. Once a certain number of packets has been downloaded to adaptor 110, or alternatively once a certain number of downloaded packets has been transferred over the network via segment 72a, controller 112 generates an interrupt to the host 100. The number of packets required before an interrupt is generated can be preset or programmable. First counter 116 can be programmed to be reset once an interrupt deferral mode has been entered in response to a packet being received from network 40, for example. Further, first counter 116 can be programmed with a value indicating a maximum cumulative number of packets, such that no matter haw many times first counter 116 is reset, adaptor controller 112 generates an interrupt when the maximum number of packets has been counted.

In another embodiment, adaptor 110 includes first counter 116 and second counter 117, each associated with different events. For example, first counter 116 may be associated with, and triggered by, packets being downloaded, and second counter 117 may be associated with, and triggered by, packets being received from network 40. The first and second time values can be programmed to be the same or different depending on the criticality or importance of the associated interrupt reasons. Adaptor controller 112 can be programmed to generate an interrupt after one counter or after both counters indicate that an Interrupt be generated. Additional counters can be included in adaptor 110 for additional events.

A further embodiment is to include both first timer 114 and first counter 116 in adaptor 110. In this embodiment, both timer and counter based interrupts are used such that an interrupt is generated after a certain number of packets are processed or after a certain time elapses. The specific number of packets and the delay time can be preset or programmable, as above. Further, both first counter 116 and first timer 114 can be reset. Once an interrupt deferral mode has been entered, for example after receiving a packet, the first interrupt counter 116 or first interrupt timer 114 may be reset if another packet is received during that interrupt deferral time, so as to combine events prior to generating an interrupt. Additionally, second timer 115 and second counter 117 may be included in adaptor 110 for additional interrupt events.

In operation, when data is received from LAN 40, adaptor controller 112 receives the data, translates the data packets into a digital form for storing in system memory 120 and uploads the data to receive buffer 124 of system memory 120. Buffer 118 may be used as a temporary store for the received data. To alert the host that data has been received, adaptor controller 112 generates and sends an interrupt to the host operating system. Typically, when an interrupt request is received by the host, the host responds by requesting status and identification information, such as whether receipt was successful and information identifying where in receive buffer 124 the data is located. Processing such interrupt requests can be very burdensome to a host operating system, especially where the network transfer rate exceeds the maximum sustained transfer capability of the host's memory subsystem. Rather than requiring the host to respond to an interrupt for each data packet received, programming a delay for sending data received interrupts allows more packets to be queued in receive buffer 124 before the host is required to respond to an interrupt.

In one embodiment, adaptor 110 includes first timer 114. First timer 114 is programmed with a time value and provides a delay time for generating an interrupt associated with an interrupt reason. After an interrupt reason triggers, or sets, first timer 114, an interrupt is not generated until after the timer delay. For example, when adaptor controller 112 receives a packet from network 40, an interrupt is not generated until after the appropriate time delay indicated by timer 114. Alternatively, an interrupt is not generated until an appropriate time delay after a last packet of a series of data packets is received. In this embodiment, the time delay value is a preset value according to general system parameters, but may be user-programmable, system-programmable, set with a specific time irrespective of system parameters, or may be set with different time values for different interrupt reasons, as above. Additional timers, such as second timer 115, can be included for additional interrupt events.

In another embodiment, adaptor 110 includes first counter 116. In this embodiment, first counter 116 counts the number of packets as they are received from network 40. Alternatively, first counter 116 counts the number of packets that are uploaded into receive buffer 124. Once a certain number of packets has been received, or uploaded, controller 112 generates an interrupt to the host 100. The number of packets required before an interrupt is generated can be preset or programmable. First counter 116 can be programmed to be reset once an interrupt deferral mode has been entered in response to a packet being received from network 40, for example. Additional counters, such as second counter 117, can be included in adaptor 110 for different interrupt events.

A further embodiment is to include both first timer 114 and first counter 116 in adaptor 110. In this embodiment, both timer and counter based interrupts are used such that an interrupt is generated after a certain number of packets are received or processed, or after a certain time elapses. The specific number of packets and the delay time can be preset or programmable. Further, both first counter 116 and first timer 114 can be reset. Once an interrupt deferral mode has been entered, for example after receiving a packet, the first interrupt counter 116 or first interrupt timer 114 may be reset if another packet is received during that interrupt deferral time, so as to combine events prior to generating an interrupt. Additionally, second timer 115 and second counter 117 may be included in adaptor 110 for additional interrupt events.

The invention has now been explained with reference to specific embodiments. Other embodiments will be apparent to those of ordinary skill in the art upon reference to the present description. It is therefore not intended that this invention be limited, except as indicated by the appended claims.

What is claimed is:

1. A network adaptor comprising:
   an interface for exchanging data to and from a host;
   an interrupt controller for generating interrupts to a host; and
   an interrupt deferral mechanism for determining a time period of interrupt deferral to said host, said interrupt deferral mechanism being initiated immediately upon occurrence of an interrupt-triggering event and prior to assertion of a corresponding interrupt, said time period of interrupt deferral determined by counting a number of packets requiring interrupts and by setting a timer triggered by an interrupt event and generating an interrupt after said number of packets accumulates or after a predetermined period of time elapses.

2. The network adaptor according to claim 1 wherein said period of interrupt deferral is an aggregate period that accumulates over a number of different types of interrupt conditions.

3. The network adaptor according to claim 1 wherein said period of interrupt deferral is determined assuming that network traffic at a particular host is generally self-similar in nature.

4. The network adaptor according to claim 1 wherein said period of interrupt deferral is a preset, nonadjustable period.

5. The network adaptor according to claim 1 wherein said period of interrupt deferral is programmable by adaptor driver software.

6. A network adaptor comprising:
   a data interface for exchanging data to and from a host system;
   a network interface for exchanging data to and from a network;
   an adaptor controller, connected to said data interface and to said network interface, wherein said controller generates interrupts to said host, and wherein said controller determines a period of interrupt deferral to said host, said controller initiated immediately upon occurrence of an interrupt-triggering event and prior to assertion of a corresponding interrupt; and
   a counter coupled to said controller, wherein said period of interrupt deferral is determined by counting a number of packets requiring interrupts downloaded to the adaptor from said host and generating an interrupt after a preset number of packets accumulates thereby delaying generation of an interrupt signal.

7. The network adaptor of claim 6 wherein said preset number of packets is user programmable.

8. The network adaptor of claim 6, further comprising a counter reset mechanism, wherein said period of interrupt deferral is extended by resetting said counter and generating an interrupt after said specific number of packets accumulates or after a maximum number of packets accumulates.

9. The network adaptor of claim 6, further comprising first and second counters coupled to said controller, said first counter associated with a first interrupt reason and said second counter associated with a second interrupt reason, wherein said period of interrupt deferral is determined by counting a first number of packets associated with said first interrupt reason and by counting a second number of packets associated with said second interrupt reason and generating an interrupt after said first number of packets accumulates or after said second number of packets accumulates.

10. A network adaptor comprising:
    a data interface for exchanging data to and from a host system;
    a network interface for exchanging data to and from a network;
    an adaptor controller, connected to said data interface and to said network interface, wherein said controller generates interrupts to said host, and wherein said controller determines a period of interrupt deferral to said host and;
    a timer coupled to said controller, wherein said period of interrupt deferral is determined by initiating said timer immediately upon occurrence of a first interrupt-triggering event and prior to asserting a corresponding interrupt, thereby generating the interrupt after a specific period of time elapses, said period of interrupt deferral determined by counting a number of packets requiring interrupts and by setting a timer triggered by an interrupt event and generating an interrupt after said number of packets accumulates or after a predetermined period of time elapses.

11. The network adaptor of claim 10, wherein said timer is set when a last packet of a series of data packets is downloaded to the adaptor from said host.

12. The network adaptor of claim 10, wherein said timer is set when a first packet of a series of data packets is downloaded to the adaptor from said host.

13. The network adaptor of claim 10, wherein said timer is set in response to a control bit in a descriptor attached to a data packet downloaded to the adaptor from said host.

14. The network adaptor of claim 10, wherein said specific period of time is preset in hardware.

15. The network adaptor of claim 10, wherein said specific period of time is user programmable.

16. The network adaptor of claim 10, wherein said specific period of time is determined based on system characteristics.

17. The network adaptor of claim 10, further comprising a timer reset mechanism, wherein said period of interrupt deferral is extended by resetting said timer and generating an interrupt after said specific period of time elapses or after a maximum interrupt deferral time elapses.

18. The network adaptor of claim 10, further comprising first and second timers coupled to said controller, said first timer associated with a first interrupt reason and said second timer associated with a second interrupt reason, wherein said period of interrupt deferral is determined by setting said first and second timers and generating an interrupt after a first specific period of time elapses or after a second specific period of time elapses.

19. A network adaptor comprising:
    a control interface for exchanging information to and from a host system;
    a data interface for exchanging data to and from a system memory;
    a network interface for exchanging data to and from a network;
    an adaptor controller, connected to said control and data interfaces and to said network interface, wherein said controller generates interrupts to said host, and wherein said controller determines a period of interrupt deferral to said host; and
    a timer coupled to said controller, said timer being initiated immediately upon occurrence of an interrupt-triggering event and prior to asserting a corresponding interrupt, thereby generating the interrupt after a specific period of time elapses, said period of interrupt deferral alternatively determined by counting a number of packets requiring interrupts downloaded to said adaptor from a system memory and generating an interrupt either after said number of packets accumulates or after a predetermined period of time elapses.

20. The network adaptor of claim 19, further comprising a counter reset mechanism, wherein said period of interrupt deferral is extended by resetting said counter and generating an interrupt after said specific number of packets accumulates or after a maximum number of packets accumulates.

21. The network adaptor of claim 20, wherein said timer is set when a last packet of a series of data packets is downloaded to the adaptor from said host.

22. The network adaptor of claim 20, wherein said timer is set when a first packet of a series of data packets is downloaded to the adaptor from said host.

23. The network adaptor of claim 20, wherein said timer is set in response to a control bit in a descriptor attached to a data packet downloaded to the adaptor from said host.

24. The network adaptor of claim 20, wherein said specific period of time is preset in hardware.

25. The network adaptor of claim 20, wherein said specific period of time is user programmable.

26. The network adaptor of claim 20, wherein said specific period of time is determined based on system characteristics.

27. The network adaptor of claim 20, further comprising a timer reset mechanism, wherein said period of interrupt deferral is extended by resetting said timer and generating an interrupt after said specific period of time elapses or after a maximum interrupt deferral time elapses.

28. The network adaptor of claim 19, further comprising first and second timers coupled to said controller, said first timer associated with a first interrupt reason and said second timer associated with a second interrupt reason, wherein said period of interrupt deferral is determined by setting said first and second timers and generating an interrupt after a first specific period of time elapses or after a second specific period of time elapses.

29. The network adaptor of claim 19, further comprising first and second counters coupled to said controller, said first counter associated with a first interrupt reason and said second counter associated with a second interrupt reason, wherein said period of interrupt deferral is determined by counting a first number of packets associated with said first interrupt reason and by counting a second number of packets associated with said second interrupt reason and generating an interrupt after said first number of packets accumulates or after said second number of packets accumulates.

30. A local area network comprising:
an intermediate system (IS); and
a plurality of end systems (ESs) communicably connected to said IS; wherein a first one of said ESs includes a host communicably coupled to a network adaptor, said adaptor for exchanging data to and from said IS, wherein said adaptor generates interrupts to said host, and wherein said adaptor includes an interrupt deferral mechanism for determining a period of interrupt deferral to said host, said interrupt deferral mechanism being initiated immediately upon occurrence of an interrupt-triggering event and prior to asserting its corresponding interrupt, said adaptor further includes a counter, wherein said period of interrupt deferral is determined by counting a number of packets requiring interrupts downloaded to the adaptor from said host for transmittal to said IS and generating an interrupt after said number of packets accumulates or after said period of interrupt deferral elapses.

31. The network of claim 30, wherein said IS comprises one of a router and a bridge.

32. The network of claim 30, wherein said first ES comprises one of a personal computer, a server, a workstation, a printer, and a digital telephone.

33. The network of claim 32, wherein said adaptor further includes a counter reset mechanism, wherein said period of interrupt deferral is extended by resetting said counter and generating an interrupt after said specific number of packets accumulates or after a maximum number of packets accumulates.

34. The network of claim 30, wherein said adaptor further includes a timer, wherein said period of interrupt deferral is determined by setting said timer and generating an interrupt after a specific period of time elapses.

35. The network of claim 34, wherein said timer is set when a last packet of a series of data packets is downloaded to the adaptor from said host for transmittal to said IS.

36. The network of claim 34, wherein said timer is set when a first packet of a series of data packets is downloaded to the adaptor from said host for transmittal to said IS.

37. The network of claim 34, wherein said timer is set in response to a control bit in a descriptor attached to a data packet downloaded to the adaptor from said host for transmittal to said IS.

38. The network of claim 34, wherein said specific period of time is preset in hardware.

39. The network of claim 34, wherein said specific period of time is user programmable.

40. The network of claim 34, wherein said specific period of time is determined based on system characteristics.

41. The network of claim 34, wherein said adaptor further includes a timer reset mechanism, wherein said period of interrupt deferral is extended by resetting said timer and generating an interrupt after said specific period of time elapses or after a maximum interrupt deferral time elapses.

42. The network of claim 30, wherein said adaptor further includes first and second timers, said first timer associated with a first interrupt reason and said second timer associated with a second interrupt reason, wherein said period of interrupt deferral is determined by setting said first and second timers and generating an interrupt after a first specific period of time elapses or after a second specific period of time elapses.

43. The network of claim 30, wherein said adaptor further includes first and second counters, said first counter associated with a first interrupt reason and said second counter associated with a second interrupt reason, wherein said period of interrupt deferral is determined by counting a first number of packets associated with said first interrupt reason and by counting a second number of packets associated with said second interrupt reason and generating an interrupt after said first number of packets accumulates or after said second number of packets accumulates.

* * * * *